(12) United States Patent
Chen et al.

(10) Patent No.: US 11,906,286 B2
(45) Date of Patent: Feb. 20, 2024

(54) DEEP LEARNING-BASED TEMPORAL PHASE UNWRAPPING METHOD FOR FRINGE PROJECTION PROFILOMETRY

(71) Applicant: Nanjing University of Science and Technology, Jiangsu (CN)

(72) Inventors: Qian Chen, Nanjing (CN); Chao Zuo, Nanjing (CN); Shijie Feng, Nanjing (CN); Yuzhen Zhang, Nanjing (CN); Guohua Gu, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 567 days.

(21) Appl. No.: 17/280,464

(22) PCT Filed: Jul. 5, 2019

(86) PCT No.: PCT/CN2019/094884
§ 371 (c)(1),
(2) Date: Mar. 26, 2021

(87) PCT Pub. No.: WO2020/063013
PCT Pub. Date: Apr. 2, 2020

(65) Prior Publication Data
US 2021/0356258 A1  Nov. 18, 2021

(30) Foreign Application Priority Data
Sep. 29, 2018  (CN) .......................... 201811149287.9

(51) Int. Cl.
*G01B 11/25* (2006.01)
*G06N 3/04* (2023.01)
(Continued)

(52) U.S. Cl.
CPC ............. *G01B 11/25* (2013.01); *G06N 3/049* (2013.01); *G06N 3/08* (2013.01)

(58) Field of Classification Search
CPC .... G01B 11/25; G01B 11/2527; G06N 3/045; G06N 3/048; G06N 3/049; G06N 3/08
See application file for complete search history.

(56) References Cited

U.S. PATENT DOCUMENTS

| | | | |
|---|---|---|---|
| 7,920,673 B2 | 4/2011 | Lanza et al. | |
| 8,929,644 B2 | 1/2015 | Zhang et al. | |

(Continued)

FOREIGN PATENT DOCUMENTS

| | | |
|---|---|---|
| CA | 2 353 720 A1 | 1/2003 |
| CN | 101105393 A | 1/2008 |

(Continued)

OTHER PUBLICATIONS

International Search Report, issued in PCT/CN2019/094884, dated Oct. 9, 2019.

(Continued)

*Primary Examiner* — Michael J Vanchy, Jr.
(74) *Attorney, Agent, or Firm* — Birch, Stewart, Kolasch & Birch, LLP

(57) ABSTRACT

The invention discloses a deep learning-based temporal phase unwrapping method for fringe projection profilometry. First, four sets of three-step phase-shifting fringe patterns with different frequencies (including 1, 8, 32, and 64) are projected to the tested objects. The three-step phase-shifting fringe images acquired by the camera are processed to obtain the wrapped phase map using a three-step phase-shifting algorithm. Then, a multi-frequency temporal phase unwrapping (MF-TPU) algorithm is used to unwrap the wrapped phase map to obtain a fringe order map of the high-frequency phase with 64 periods. A residual convolutional neural network is built, and its input data are set to be the wrapped phase maps with frequencies of 1 and 64, and the output data are set to be the fringe order map of the high-frequency phase with 64 periods. Finally, the training dataset and the validation dataset are built to train and validate the network. The network makes predictions on the test dataset to output the fringe order map of the high-frequency phase with 64 periods. The invention exploits a deep learning method to unwrap a wrapped phase map with a frequency of 64 using a wrapped phase map with a frequency of 1 and obtain an absolute phase map with fewer phase errors and higher accuracy.

6 Claims, 3 Drawing Sheets

(51) Int. Cl.
*G06N 3/08* (2023.01)
*G06N 3/049* (2023.01)

(56) References Cited

U.S. PATENT DOCUMENTS

| | | | |
|---|---|---|---|
| 2010/0027739 A1 | 2/2010 | Lanza et al. | |
| 2014/0064603 A1 | 3/2014 | Zhang et al. | |
| 2014/0253929 A1* | 9/2014 | Huang | G01B 11/2545 |
| | | | 356/611 |
| 2015/0139385 A1* | 5/2015 | Bone | G06T 7/521 |
| | | | 378/36 |

FOREIGN PATENT DOCUMENTS

| | | |
|---|---|---|
| CN | 101329169 A | 12/2008 |
| CN | 102155924 A | 8/2011 |
| CN | 103759673 A | 4/2014 |
| CN | 103791856 A | 5/2014 |
| CN | 106840036 A | 6/2017 |
| CN | 108319693 A | 7/2018 |
| CN | 108510546 A | 9/2018 |
| CN | 108596008 A | 9/2018 |
| CN | 109253708 A | 1/2019 |

OTHER PUBLICATIONS

Yan et al., "Neural network applied to reconstruction of complex objects based on fringe projection", Optics Communications, Oct. 30, 2007, vol. 278, pp. 274-278.

* cited by examiner

Tested object

Projector　　　　　　　　　　　Camera (a) (b) (c)

(d) (e)

(a) (b) (c)

DEEP LEARNING-BASED TEMPORAL PHASE UNWRAPPING METHOD FOR FRINGE PROJECTION PROFILOMETRY

FIELD OF THE INVENTION

The invention belongs to the field of three-dimensional measurement technology, in particular to a deep learning-based temporal phase unwrapping method for fringe projection profilometry.

BACKGROUND OF THE INVENTION

In recent years, high-speed 3D shape measurement techniques are widely used in various fields such as biomechanics, intelligent monitoring, robot navigation, industrial quality control, and human-computer interaction. Among plenty of state-of-the-art methods, fringe projection profilometry (FPP), which is based on the principle of structured light and triangulation, has been proven to be one of the most promising techniques due to its inherent advantages of non-contactness, high accuracy, high efficiency, and low cost. The mainstream FPP techniques generally contain three processes to achieve 3D measurements, namely phase retrieval, phase unwrapping, and phase to height mapping.

The two most common methods used in phase retrieval techniques are Fourier transform profilometry (FTP) and Phase-shifting profilometry (PSP). FTP is highly suited for dynamic 3D acquisition and can provide the phase map using a single fringe pattern. But it suffers from the spectrum overlapping problem which limits its measurement quality and precludes the recovery of the fine details of complex surfaces. In contrast, PSP is quite robust to ambient illumination and varying surface properties and can achieve pixel-wise phase measurement results with higher resolution and accuracy, but it generally requires the multiple fringe patterns to reconstruct the 3D shape of the object. When measuring dynamic scenes, the motion will lead to phase distortion artifacts, especially when the object motion during the interframe time gap is non-negligible. With the rapid advances of the high-frame-rate camera, high-speed digital light processing (DLP) projection technique, and high-performance processors, numerous PSP methods have been demonstrated in high-speed 3D shape measurement of dynamic scenes such as fast moving objects, rapidly rotating, or vibrating non-rigid bodies. Furthermore, both PSP and FTP adopt the arctangent function ranging between $-\pi$ and $\pi$ for phase calculation, which results in phase ambiguities in the wrapped phase map with $2\pi$ phase jumps. Therefore, it is necessary to carry out the phase unwrapping to eliminate the phase ambiguity and convert the wrapped phase maps into the absolute ones.

In general, phase unwrapping algorithms can be classified into two main categories: spatial phase unwrapping (SPU) and temporal phase unwrapping (TPU). Based on the assumption of spatial continuity, SPU calculates the relative fringe order of the center pixel on a single wrapped phase map by analyzing the phase information of its neighboring pixels, thus it cannot successfully measure discontinuities and isolated objects. Conversely, TPU approaches can realize pixel-wise absolute phase unwrapping via the temporal analysis of more than one wrapped phase maps with different frequencies even under the conditions of truncated or spatially isolated areas. Currently, there are three representative approaches to TPU: multi-frequency (hierarchical) approach (MF-TPU), multi-wavelength (heterodyne) approach, and number-theoretical approach. The unwrapping success rate and anti-noise performance of these TPU algorithms have been analyzed and discussed in a comparative review, revealing that the MF-TPU approach provides the highest unwrapping reliability and best noise-robustness among others (Zuo, C., Huang, L., Zhang, M., Chen, Q. & Asundi, A. Temporal phase unwrapping algorithms for fringe projection profilometry: A comparative review. Opt. Lasers Eng. 85, 84-103 (2016).). In MF-TPU, two groups of phase-shifting fringe patterns with different frequencies are used: the high-frequency one is applied for 3D reconstruction of the tested object and the unit-frequency one is used to assist phase unwrapping for the wrapped phase with high frequency. The final measurement precision or sensitivity is determined by the number of fringes used within the high-frequency pattern, under the precondition that its absolute phase can be successfully recovered without any fringe order errors. However, due to the non-negligible noises and other error sources in actual measurement, the frequency of the high-frequency fringes is generally restricted to about 16, resulting in limited measurement accuracy. On the other hand, using additional intermediate sets of fringe patterns can unwrap the phase with higher frequency, but at the expense of a prolonged pattern sequence. It further reduces the measurement efficiency of fringe projection profilometry and limits its ability to measure moving objects. Therefore, for 3D measurement technology based on fringe projection profilometry, a method with high accuracy and high efficiency is still needed.

SUMMARY OF THE INVENTION

The object of the invention is to provide a deep learning-based temporal phase unwrapping method for fringe projection profilometry, which achieves high-accuracy 3D measurements without additional projection patterns. The technical solution for achieving the object of the invention is: a deep learning-based temporal phase unwrapping method for fringe projection profilometry. First, four sets of three-step phase-shifting fringe patterns with different frequencies (including 1, 8, 32, and 64) are projected to the tested objects. The three-step phase-shifting fringe images acquired by the camera are processed to obtain the wrapped phase map using a three-step phase-shifting algorithm. Then, a multi-frequency temporal phase unwrapping (MF-TPU) algorithm is used to unwrap the wrapped phase map to obtain a fringe order map of the high-frequency phase with 64 periods. A residual convolutional neural network is built, and its input data are set to be the wrapped phase maps with frequencies of 1 and 64, and the output data are set to be the fringe order map of the high-frequency phase with 64 periods. Finally, the training dataset and the validation dataset are built to train and validate the network. The network makes predictions on the test dataset to output the fringe order map of the high-frequency phase with 64 periods.

Compared with existing methods, the invention has significant advantages: due to the non-negligible noises and other error sources in actual measurement, a multi-frequency temporal phase unwrapping (MF-TPU) algorithm cannot be used to unwrap the high-frequency wrapped phase map with frequencies of 64 using the low-frequency wrapped phase map with frequencies of 1. The result has a large number of error points. The invention uses a deep learning approach to achieve temporal phase unwrapping. Compared with the multi-frequency temporal phase unwrapping (MF-TPU) algorithm, a residual convolutional neural network is used to implement phase unwrapping, which exploits the low-frequency wrapped phase map with frequencies of 1 to unwrap the high-frequency wrapped phase map with frequencies of 64. The absolute phase map with fewer phase errors and higher accuracy can be obtained by using this method.

The invention is further described in detail below with reference to the accompanying drawings.

DESCRIPTION OF THE PREFERRED EMBODIMENT

Figure 1:
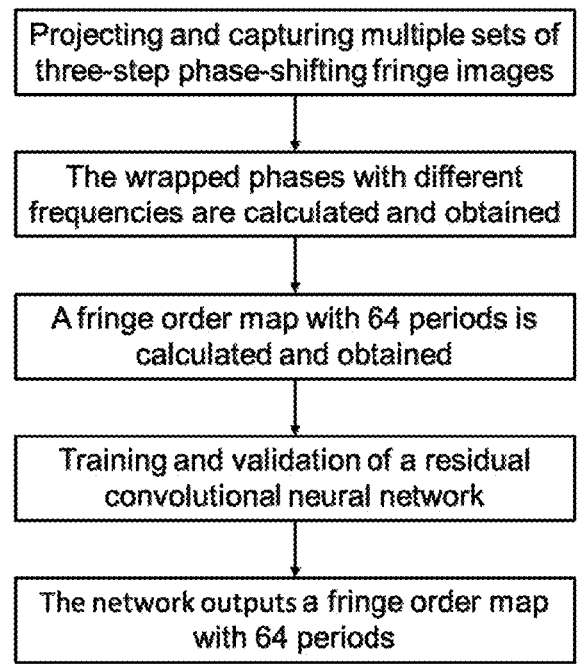
FIG. 1 shows the schematic diagram of a deep learning-based temporal phase unwrapping method for fringe projection profilometry.

The invention is based on a deep learning-based temporal phase unwrapping method for fringe projection profilometry. The steps of the invention are as follows: step one, four sets of three-step phase-shifting fringe patterns with different frequencies are projected to the tested objects. Each set of patterns contains three fringe patterns with the same frequency and different initial phase. Any set of three-step phase-shifting fringe patterns projected by the projector can be represented as:

$$I_1^p(x^p, y^p) = 128 + 127 \cos[2\pi f x^p/W]$$

$$I_2^p(x^p, y^p) = 128 + 127 \cos[2\pi f x^p/W + 2\pi/3]$$

$$I_3^p(x^p, y^p) = 128 + 127 \cos[2\pi f x^p/W + 4\pi/3]$$

where $I_1^p(x^p, y^p)$, $I_2^p(x^p, y^p)$, $I_3^p(x^p, y^p)$ are three-step phase-shifting fringe patterns projected by the projector. $(x^p, y^p)$ is the pixel coordinate of the projector. W is the horizontal resolution of the projector. f is the frequency of phase-shifting fringe patterns. A DLP projector is used to project four sets of three-step phase-shifting fringe patterns onto the tested objects. The frequencies of four sets of three-step phase-shifting fringe patterns are 1, 8, 32, and 64, respectively. Each set of three fringe patterns has the same frequency. The projected fringe patterns are captured by the camera simultaneously. The acquired three-step phase-shifting fringe images are represented as:

$$I_1(x, y) = A(x, y) + B(x, y)\cos[\Phi(x, y)]$$

$$I_2(x, y) = A(x, y) + B(x, y)\cos[\Phi(x, y) + 2\pi/3]$$

$$I_3(x, y) = A(x, y) + B(x, y)\cos[\Phi(x, y) + 4\pi/3]$$

where $I_1(x, y)$, $I_2(x, y)$, $I_3(x, y)$ are three-step phase-shifting fringe images. (x, y) is the pixel coordinate of the camera. A(x, y) is the average intensity. B(x, y) is the intensity modulation. $\Phi(x, y)$ is the phase distribution of the measured object.

step two, the wrapped phase $\varphi(x, y)$ can be obtained as:

$$\varphi(x, y) = \arctan\frac{\sqrt{3}(I_1(x, y) - I_3(x, y))}{2I_2(x, y) - I_1(x, y) - I_3(x, y)}$$

Figure 3:
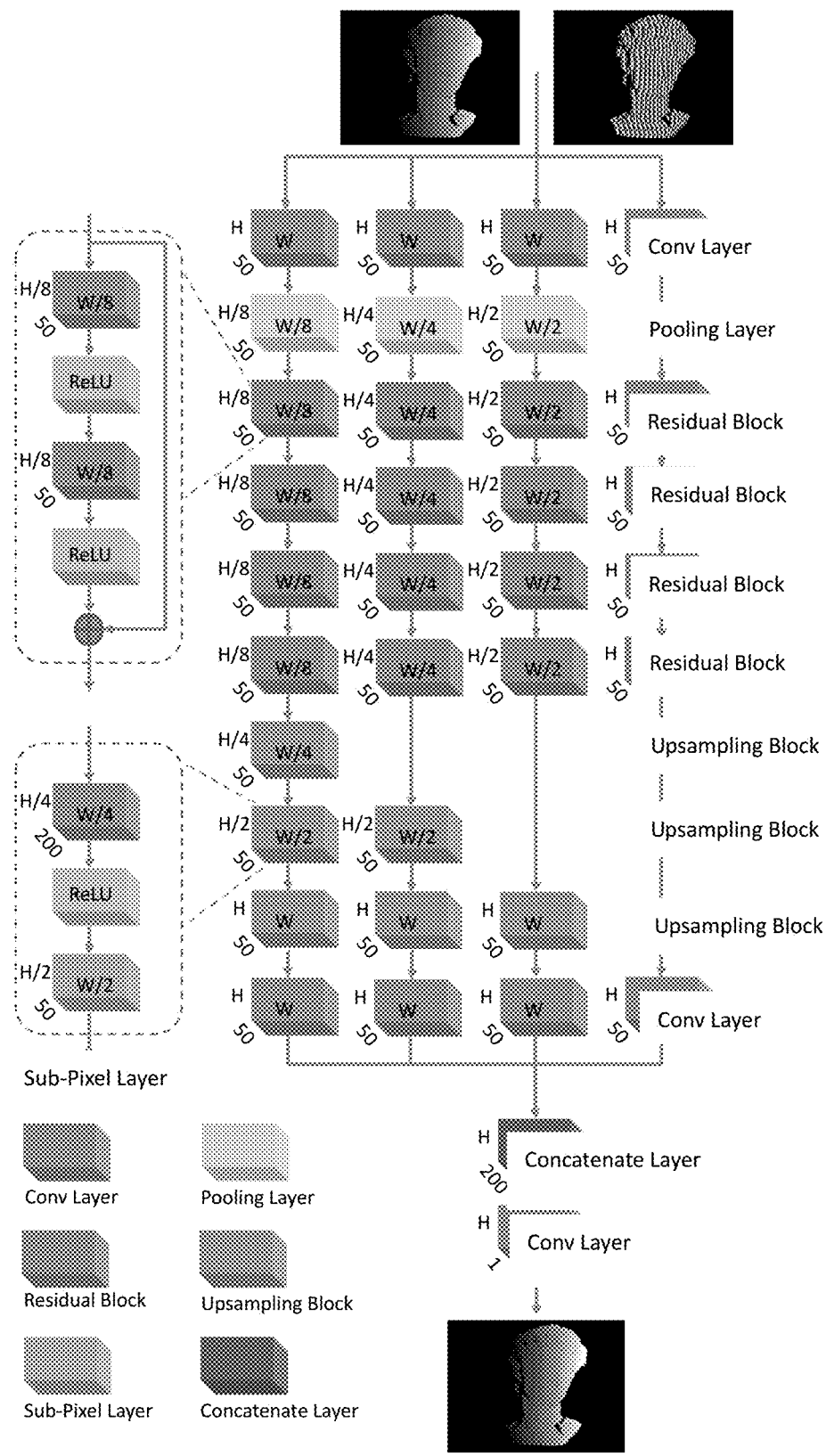
FIG. 3 shows the structure of the deep learning-based residual convolutional neural network proposed in the invention.

Due to the truncation effect of the arctangent function, the obtained phase $\varphi(x, y)$ is wrapped within the range of $[0, 2\pi]$, and its relationship with $\Phi(x, y)$ is:

$$\Phi(x, y) = \varphi(x, y) + 2\pi k(x, y)$$

where k(x, y) represents the fringe order of $\Phi(x, y)$, and its value range is from 0 to N−1. N is the period number of the fringe patterns (i.e., N=f).

step three, the distribution range of the absolute phase map with unit frequency is $[0, 2\pi]$, so the wrapped phase map with unit frequency is an absolute phase map. By using a multi-frequency temporal phase unwrapping (MF-TPU) algorithm, an absolute phase map with a frequency of 8 can be unwrapped with the aid of the absolute phase map with unit frequency. An absolute phase map with a frequency of 32 can be unwrapped with the aid of the absolute phase map with a frequency of 8. An absolute phase map with a frequency of 64 can be unwrapped with the aid of the absolute phase map with a frequency of 32. The absolute phase map can be calculated by the following formula:

$$k_h(x, y) = \text{Round}\left(\frac{(f_h/f_l)\Phi_l(x, y) - \varphi_h(x, y)}{2\pi}\right)$$

$$\Phi_h(x, y) = \varphi_h(x, y) + 2\pi k_h(x, y)$$

where $f_h$ is the frequency of high-frequency fringe images. $f_l$ is the frequency of low-frequency fringe images. $\varphi_h(x, y)$ is the wrapped phase map of high-frequency fringe images, $k_h(x, y)$ is the fringe order map of high-frequency fringe images. $\Phi_h(x, y)$ is the absolute phase map of high-frequency fringe images, $\Phi_l(x, y)$ is the absolute phase map of low-frequency fringe images. Round( ) is the rounding operation. Based on the principle of the multi-frequency temporal phase unwrapping (MF-TPU) algorithm, the absolute phase can be obtained theoretically by directly using the absolute phase with unit-frequency to assist in unwrapping the wrapped phase with a frequency of 64. Due to the non-negligible noises and other error sources in actual measurement, a multi-frequency temporal phase unwrapping (MF-TPU) algorithm cannot be used to unwrap the high-frequency wrapped phase map with frequencies of 64 using the low-frequency wrapped phase map with frequencies of 1. The result has a large number of error points. Therefore, the multi-frequency temporal phase unwrapping (MF-TPU) algorithm generally use multiple sets of wrapped phase maps with different frequencies to unwrap sequentially the high-frequency wrapped phase map, which finally obtains the absolute phase with frequencies of 64. It is obvious that the multi-frequency temporal phase unwrapping (MF-TPU) algorithm consumes a lot of time and cannot achieve fast and high-precision 3D measurements based on fringe projection profilometry.

step four, a residual convolutional neural network is built to implement phase unwrapping. Steps one to three are repeatedly performed to obtain multiple sets of data, which are divided into a training dataset, a validation dataset, and a test dataset. The training dataset is used to train the residual convolutional neural network. The validation dataset is used to verify the performance of the trained network. Firstly, a residual convolutional neural network is built to implement phase unwrapping, and FIG. 3 shows the structure of the neural network. From FIG. 3. a residual convolutional neural network consists of six modules, including convolutional layers, pooling layers, concatenate layers, residual blocks. and upsampling blocks. Among these modules, convolutional layers, pooling layers, and concatenate Layer are common modules in traditional convolutional neural networks. The convolutional layer consists of multiple convolutional kernels. The number of convolutional kernels is the number of channels in the convolutional layer, and each convolutional kernel independently performs a convolution operation on the input data to generate the output tensor. The pooling layer compresses the input tensor and extracts the main features of the input tensor, which simplifies the network computational complexity and prevents overfitting. The common pooling layers are averagepooling layer and maxpooling layer. In our network, ½ downsampling, ¼ downsampling, and ⅛ downsampling are performed on the input tensor using the maximum pooling layer. The concatenate layer fuses the input tensor of each path. In addition, four residual blocks are used in each path of the network to solve the problem of gradient disappearance in the deep network and prevent overfittiing and to accelerate the loss convergence of the network (He, K., Zhang, X., Ren, S., Sun, J. Deep Residual Learning for Image Recognition. Proceedings of the IEEE conference on computer vision and pattern recognition. 770-778 (2016).). Each residual block contains two convolutional layers and two activation functions (ReLU). Due to the maxpooling layer, it leads to the problem of inconsistent size of the tensor in each path. Therefore, different numbers of upsampling blocks are used for different paths to make the size of the tensor in each path consistent. The upsampling block consists of a convolutional layer, an activation function (ReLU), and a subpixel Layer. The subpixel layer uses rich channel data of the input tensor to upsample the tensor in the spatial dimension so that the number of channels of the tensor is 1/4 size of the original and the horizontal and vertical dimensions of the tensor size are twice size of the original (Shi, W., Caballero, J., Huszár, F., et al. Real-Time Single Image and Video Super-Resolution Using an Efficient Sub-Pixel Convolutional Neural Network. Proceedings of the IEEE conference on computer vision and pattern recognition. 1874-1883 (2016).)

Although these modules used in the network are existing, the innovation of the invention lies in how to use the existing modules to build a network model that enables phase unwrapping, as shown in FIG. 3. After the model of the network is built, the input data of the network is set to the wrapped phase maps with frequencies of I and 64 obtained in step two, and the output data of the network is set to the fringe order map of the phases with frequencies of 64 obtained in step three, instead of the absolute phases with frequencies of 64. Because the absolute phase is the sum of the fringe order of the phase and the wrapped phase map, the fringe order of the phase is only needed to obtain the absolute phase. In addition, the data type of the fringe order of the phase is integer, while the data type of the absolute phase map is floating. The fringe order of the phase as the output data of the network will reduce the complexity of the network and make the loss of the network converge faster, thus effectively improving the output accuracy of the network. Next, steps one to three are repeatedly performed to obtain multiple sets of data, which are divided into a training dataset, a validation dataset, and a test dataset. For the residual convolutional neural network, the input data are set to be the wrapped phase maps with frequencies of 1 and 64, and the output data are set to be the fringe order map of the high-frequency phase with frequencies of 64. To monitor the accuracy of the trained neural networks on data that they have never seen before, a validation dataset is created that is separate from the training scenarios. Before training the residual convolutional neural network, the acquired data is preprocessed. Because the fringe image obtained by the camera contains the background and the tested object, and the background is removed by the following equation:

$$M(x, y) = \frac{2}{3}\sqrt{3(I_1(x, y) - I_3(x, y))^2 + (2I_2(x, y) - I_1(x, y) - I_3(x, y))^2}$$

where M(x, y) is the intensity modulation in actual measurement. The modulation corresponding to the points belonging to the background in the image is much smaller than the modulation corresponding to the points of the measured objects, and the background in the image can be removed by setting a threshold value. The data after the background removal operation is used as the dataset of the residual convolutional neural network for training. In the network configuration, the loss function is set as mean square error (MSE), the optimizer is Adam, the size of mini-batch is 2, and the training epoch is set as 500. To avoid over-fitting as the common problem of the deep neural network, L2 regularization is adopted in each convolution layer of residual blocks and upsampling blocks instead of all convolution layers of the proposed network, which can enhance the generalization ability of the network. The training dataset is used to train the residual convolutional neural network. The validation dataset is used to verify the performance of the trained network.

step five, the residual convolutional neural network predicts the output data based on the input data in the test dataset. By comparing the real output data in the test dataset with the output data predicted by the network, the comparison results are used to evaluate the accuracy of the network. Due to the non-negligible noises and other error sources in actual measurement, a multi-frequency temporal phase unwrapping (MF-TPU) algorithm cannot be used to unwrap the high-frequency wrapped phase map with frequencies of 64 using the low-frequency wrapped phase map with frequencies of 1. The result has a large number of error points. The invention uses a deep learning approach to achieve temporal phase unwrapping. Compared with the multi-frequency temporal phase unwrapping (MF-TPU) algorithm, a residual convolutional neural network is used to implement phase unwrapping, which exploits the low-frequency wrapped phase map of 1 to unwrap the high-frequency wrapped phase map with frequencies of 64. The absolute phase map with fewer phase errors and higher accuracy can be obtained by using this method.

Example of Implementation

Figure 2:
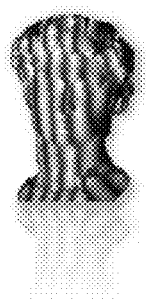
FIG. 2 shows the schematic diagram of the 3D measurement system proposed in the invention.
Figure 2:
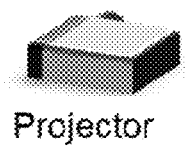
Figure 2:
Figure 4:
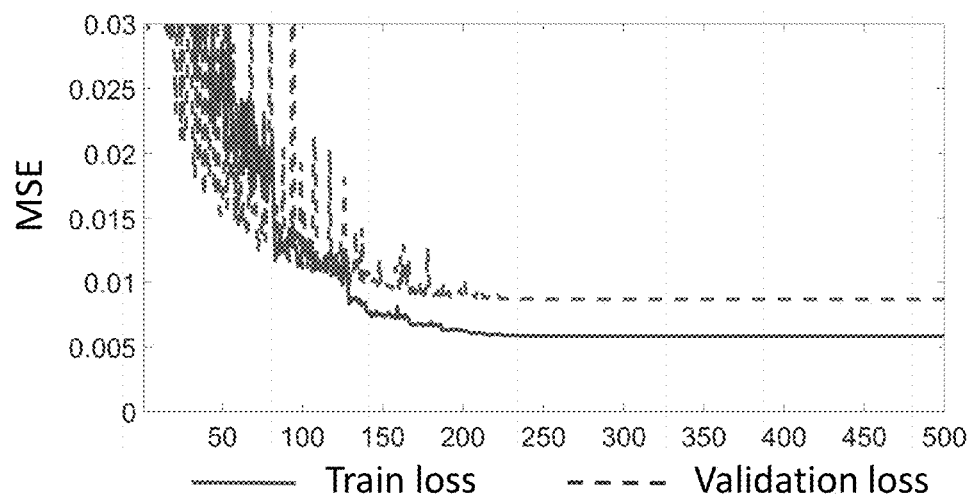
FIG. 4 shows the training and validation loss curve of the residual convolutional neural network after 500 rounds.
Figure 5:
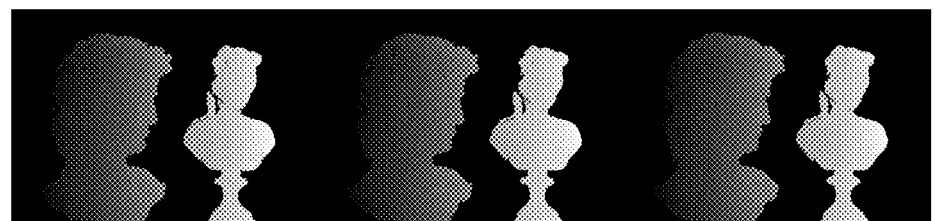
FIG. 5 shows a fringe order map of the phase for a sample data in the test dataset. (a) a fringe order map of the phase with a frequency of 64 obtained using two sets of wrapped phase maps based on the MF-TPU algorithm. (b) a fringe order map of the phase with a frequency of 64 obtained using two sets of wrapped phase maps based on the deep learning-based method. (c) a fringe order map of the phase with a frequency of 64 obtained using four sets of wrapped phase maps based on the MF-TPU algorithm. (d) the difference between (a) and (c). (e) the difference between (b) and (c).
Figure 5:
Figure 6:
FIG. 6 shows 3D results of a sample data in the test dataset. (a) 3D results obtained using two sets of wrapped phase maps based on the MF-TPU algorithm. (b) 3D results obtained using two sets of wrapped phase maps based on the deep learning-based method. (c) 3D results obtained using four sets of wrapped phase maps based on the MF-TPU algorithm.

To verify the actual performance of the proposed method described in the invention, a monochrome camera (Basler acA640-750um with the resolution of 640×480), a DLP projector (LightCrafter 4500Pro with the resolution of 912× 1140), and a computer are used to construct a 3D measurement system based on a deep learning-based temporal phase unwrapping method for fringe projection profilometry, as shown in FIG. 2. The system captures the images at the speed of 25 Hz when measuring 3D profiles of objects. According to step one, four sets of three-step phase-shifting fringe patterns with different frequencies (including 1, 8, 32, and 64) are projected to the tested objects. The projected fringe patterns are captured by the camera simultaneously to acquire four sets of three-step phase-shifting fringe images. According to step two, the three-step phase-shifting fringe images acquired by the camera are processed to obtain the wrapped phase map using a three-step phase-shifting algorithm. According to step three, a multi-frequency temporal phase unwrapping (MF-TPU) algorithm is used to unwrap four wrapped phase maps successively to obtain a fringe order map and an absolute phase map for the high-frequency phase with 64 periods. According to step four, a residual convolutional neural network is built to implement phase unwrapping. Steps one to three are repeatedly performed to obtain 1100 sets of data, of which 800 sets of data are used as the training dataset, 200 sets of data as the validation dataset, and 100 sets of data as the test dataset. To monitor the accuracy of the trained neural networks on data that they have never seen before, a validation dataset is created that is separate from the training scenarios. The data after the background removal operation is used as the dataset of the residual convolutional neural network for training. In the network configuration, the loss function is set as mean square error (MSE), the optimizer is Adam, the size of mini-batch is 2, and the training epoch is set as 500. FIG. 4 shows the training and validation loss curve of the residual convolutional neural network after 500 rounds. FIG. 4 shows that the network stops converging after 250 rounds. The loss value of the final training dataset is about 0.0058 and the loss value of the final validation dataset is about 0.0087. According to step five, the trained residual convolutional neural network is used to predict the output data based on the input data in the test dataset for evaluating the accuracy of the network. A comparative experiment is implemented for a sample data in the test dataset, and the results are shown in FIG. 5. FIG. 5 shows a fringe order map of the phase for a sample data in the test dataset. FIG. 5(a) is a fringe order map of the phase with a frequency of 64 obtained using two sets of wrapped phase maps based on the MF-TPU algorithm. FIG. 5(b) is a fringe order map of the phase with a frequency of 64 obtained using two sets of wrapped phase maps based on the deep learning-based method. FIG. 5(c) is a fringe order map of the phase with a frequency of 64 obtained using four sets of wrapped phase maps based on the MF-TPU algorithm. FIG. 5(d) is the difference between FIG. 5(a) and FIG. 5(c), the number of error points is 8909. FIG. 5(e) is the difference between FIG. 5(b) and FIG. 5(c), the number of error points is 381. Compared with the multi-frequency temporal phase unwrapping (MF-TPU) algorithm, it can be proved in FIG. 5 that the absolute phase map with fewer phase errors and higher accuracy can be obtained by using the deep leaning-based method proposed in the invention. FIG. 6 shows 3D results of a sample data in the test dataset. FIG. 6(a) shows 3D results obtained using two sets of wrapped phase maps based on the MF-TPU algorithm. FIG. 6 (b) shows 3D results obtained using two sets of wrapped phase maps based on the deep learning-based method. FIG. 6(c) shows 3D results obtained using four sets of wrapped phase maps based on the MF-TPU algorithm. The results in FIG. 6 further demonstrate that high-precision 3D measurements can be achieved without increasing the number of patterns projected by the projector, which improves the measurement efficiency.

The invention claimed is:

1. A deep learning-based temporal phase unwrapping method for fringe projection profilometry is characterized in that the specific steps are as follows:

step one, four sets of three-step phase-shifting fringe patterns with different frequencies (including 1, 8, 32, and 64) are projected to tested objects; the projected fringe patterns are captured by a camera simultaneously to acquire four sets of three-step phase-shifting fringe images;

step two, the three-step phase-shifting fringe images acquired by the camera are processed to obtain a wrapped phase map using a three-step phase-shifting algorithm;

step three, a multi-frequency temporal phase unwrapping (MF-TPU) algorithm is used to unwrap four wrapped phase maps successively to obtain a fringe order map and an absolute phase map of a high-frequency phase with 64 periods;

step four, a residual convolutional neural network is built to implement phase unwrapping; steps one to three are repeatedly performed to obtain multiple sets of data, which are divided into a training dataset, a validation dataset, and a test dataset; the training dataset is used to train the residual convolutional neural network; the validation dataset is used to verify the performance of the trained network;

step five, the residual convolutional neural network after training and validation makes predictions on the test dataset to realize a precision evaluation of the network and output the fringe order map of the high-frequency phase with 64 periods.

2. According to claim 1, a deep learning-based temporal phase unwrapping method for fringe projection profilometry is characterized by step one wherein four sets of three- step phase-shifting fringe patterns with different frequencies are projected to the tested objects;

each set of patterns contains three fringe patterns with the same frequency and different initial phase; any set of three-step phase-shifting fringe patterns projected by a projector is represented as:

$$I_1^P(x^P, y^P)=128+127\cos[2\pi f x^P/W]$$

$$I_2^P(x^P, y^P)=128+127\cos[2\pi f x^P/W+27\pi/3]$$

$$I_3^P(x^P, y^P)=128+127\cos[2\pi f x^P/W+4\pi/3]$$

where $I_1^P(x^P, y^P)$, $I_2^P(x^P, y^P)$, $I_3^P(x^P, y^P)$ are three-step phase-shifting fringe patterns projected by the projector; $(x^P, y^P)$ is a pixel coordinate of the projector; W is a horizontal resolution of the projector; f is a frequency of phase-shifting fringe patterns; a DLP projector is used to project four sets of three-step phase-shifting fringe patterns onto the tested objects; the frequencies of four sets of three-step phase-shifting fringe patterns are 1, 8, 32, and 64, respectively; each set of three fringe patterns has the same frequency; the projected fringe patterns are captured by the camera simultaneously; the acquired three-step phase-shifting fringe images are represented as:

$$I_1(x, y)=A(x, y)+B(x, y)\cos[\Phi(x, y)]$$

$$I_2(x, y)=A(x, y)+B(x, y)\cos[\Phi(x, y)+2\pi/3]$$

$$I_3(x, y)=A(x, y)+B(x, y)\cos[\Phi(x, y)+4\pi/3]$$

where $I_1(x, y)$, $I_2(x, y)$, $I_3(x, y)$ are three-step phase-shifting fringe images; (x, y) is a pixel coordinate of the camera; A(x, y) is an average intensity; B (x, y) is an intensity modulation; $\Phi(x, y)$ is a phase distribution the tested objects.

3. According to claim 2, a deep learning-based temporal phase unwrapping method for fringe projection profilometry is characterized by step two wherein the wrapped phase $\varphi(x, y)$ is obtained as:

$$\varphi(x, y) = \arctan \frac{\sqrt{3}(I_1(x, y) - I_3(x, y))}{2I_2(x, y) - I_1(x, y) - I_3(x, y)}$$

due to the truncation effect of the arctangent function, the obtained wrapped phase $\varphi(x, y)$ is wrapped within a range of [0, $2\pi$], and its relationship with $\Phi(x, y)$ is:

$$\Phi(x, y)=\varphi(x, y)+2\pi k(x, y)$$

where k(x, y) represents a fringe order of $\Phi(x, y)$, and its value range is from 0 to N−1; N is a period number of the fringe patterns.

4. According to claim 2, a deep learning-based temporal phase unwrapping method for fringe projection profilometry is characterized by step four wherein a residual convolutional neural network is built, consisting of six modules, including convolutional layers, pooling layers, concatenate layers, residual blocks, and upsampling blocks;

next, after the network is built, steps one to three are repeatedly performed to obtain multiple sets of data, which are divided into a training dataset, a validation dataset, and a test dataset; for the residual convolutional neural network, input data are set to be the wrapped phase maps with frequencies of 1 and 64, and output data are set to be the fringe order map of the high-frequency phase with frequencies of 64; to monitor the accuracy of the trained neural networks on data that they have never seen before, a validation dataset is created that is separate from training scenarios;

before training the residual convolutional neural network, the acquired data is preprocessed;because the fringe image obtained by the camera contains a background and the tested objects, and the background is removed by the following equation:

$$M(x, y) = \frac{2}{3}\sqrt{3(I_1(x, y) - I_3(x, y))^2 + (2I_2(x, y) - I_1(x, y) - I_3(x, y))^2}$$

where M(x, y) is the intensity modulation in actual measurement; the modulation corresponding to points belonging to the background in the image is much smaller than the modulation corresponding to the points the tested objects, and the background in the image is removed by setting a threshold value; the data after the background removal operation is used as the dataset of the residual convolutional neural network for training; in the network configuration, a loss function is set as mean square error (MSE), a optimizer is Adam, and a training epoch is set as 500; the training dataset is used to train the residual convolutional neural network, the validation dataset is used to verify the performance of the trained network.

5. According to claim 1, a deep learning-based temporal phase unwrapping method for fringe projection profilometry is characterized by step three wherein the distribution range of the absolute phase map with unit frequency is [0,$2\pi$], so the wrapped phase map with unit frequency is an absolute phase map; by using a multi-frequency temporal phase unwrapping (MF-TPU) algorithm, an absolute phase map with a frequency of 8 is unwrapped with the aid of the absolute phase map with unit frequency; an absolute phase map with a frequency of 32 is wrapped with the aid of the absolute phase map with a frequency of 8; an absolute phase map with a frequency of 64 is unwrapped with the aid of the absolute phase map with a frequency of 32; the absolute phase map is calculated by the following formula:

$$k_h(x, y) = \text{Round}\left(\frac{(f_h/f_l)\Phi_l(x, y) - \varphi_h(x, y)}{2\pi}\right)$$

$$\Phi_h(x, y) = \varphi_h(x, y) + 2\pi k_h(x, y)$$

where $f_h$ is a frequency of high-frequency fringe images; $f_l$ is a frequency of low-frequency fringe images; $\Phi_l(x, y)$ is a wrapped phase map of high-frequency fringe images; $k_h(x, y)$ is a fringe order map of high-frequency fringe images; $\Phi_h(x, y)$ is the absolute phase map of high-frequency fringe images; $\Phi_l(x,y)$ is the absolute phase map of low-frequency fringe images; round( ) is the rounding operation.

6. According to claim 1, a deep learning-based temporal phase unwrapping method for fringe projection profilometry is characterized by step five wherein the residual convolutional neural network by comparing real output data test dataset; by comparing the real output data in the test dataset with the output data predicted by the network, the comparison results are used to evaluate the accuracy of the network.

* * * * *